US010210147B2

(12) United States Patent
DeLuca et al.

(10) Patent No.: US 10,210,147 B2
(45) Date of Patent: Feb. 19, 2019

(54) SYSTEM AND METHOD TO MINIMALLY REDUCE CHARACTERS IN CHARACTER LIMITING SCENARIOS

(71) Applicant: International Business Machines Corporation, Armonk, NY (US)

(72) Inventors: Lisa Seacat DeLuca, Baltimore, MD (US); Dana L. Price, Surf City, NC (US); Aaron J. Quirk, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 22 days.

(21) Appl. No.: 15/258,250

(22) Filed: Sep. 7, 2016

(65) Prior Publication Data
US 2018/0067912 A1 Mar. 8, 2018

(51) Int. Cl.
*G06F 17/24* (2006.01)
*G06F 17/30* (2006.01)
*G06F 3/0481* (2013.01)
*G06Q 50/00* (2012.01)

(52) U.S. Cl.
CPC ........ *G06F 17/24* (2013.01); *G06F 17/30675* (2013.01); *G06F 17/30707* (2013.01); *G06F 3/0481* (2013.01); *G06Q 50/01* (2013.01)

(58) Field of Classification Search
CPC ...................................................... G06F 17/24
See application file for complete search history.

(56) References Cited

U.S. PATENT DOCUMENTS

| 5,812,126 A * | 9/1998 | Richardson | ........... G06F 17/274 704/2 |
| 6,279,018 B1 | 8/2001 | Kudrolli et al. | |
| 7,010,478 B2 * | 3/2006 | Mathur | ............... G06F 17/2705 704/9 |
| 7,069,207 B2 * | 6/2006 | Corston-Oliver | ..... G06F 17/271 704/9 |

(Continued)

OTHER PUBLICATIONS

Arnaud Kirsch, "Text compression based on rules from a corpus of sms", Proceedings of the joint conference JEP-NLP-RECITAL, 2012, vol. 3: RECITAL, pp. 309-322.

(Continued)

*Primary Examiner* — Scott T Baderman
*Assistant Examiner* — Benjamin Smith
(74) *Attorney, Agent, or Firm* — Michael P. O'Keefe; Madeline F. Schiesser; Keohane & D'Alessandro PLLC

(57) ABSTRACT

Approaches presented herein enable reduction of characters in a character-limited scenario by minimally editing a text to remain within a character limit while maintaining a tone of a user's writing. More specifically, as a user enters text into a character-limited field, character reduction opportunities for shortening words or phrases are identified in the text. These identified opportunities for shortening words or phrases are compared with a historical writing tone profile of the user in order to preserve a tone and style of the user. Words or phrases that are presented and implemented to shorten the text entered by the user are only sufficient to bring a character count of the entered text within the character limit of the character-limited field. Once the text is within the character limit, no further character reduction is applied.

20 Claims, 8 Drawing Sheets

(56) References Cited

U.S. PATENT DOCUMENTS

| | | | | |
|---|---|---|---|---|
| 7,092,872 | B2* | 8/2006 | Polanyi | G06F 17/277 704/9 |
| 7,136,846 | B2* | 11/2006 | Chang | G06F 17/30905 |
| 7,315,902 | B2 | 1/2008 | Kirkland | |
| 7,503,001 | B1* | 3/2009 | Lekutai | G06F 17/24 455/466 |
| 7,640,160 | B2* | 12/2009 | Di Cristo | G06F 17/279 704/257 |
| 8,176,420 | B2* | 5/2012 | Lekutai | H04M 1/72552 715/261 |
| 8,812,311 | B2* | 8/2014 | Weber | G06F 17/21 386/231 |
| 8,903,719 | B1* | 12/2014 | Landry | G06F 17/21 704/10 |
| 9,025,172 | B2* | 5/2015 | Maruyama | G06F 3/1297 358/1.13 |
| 9,047,259 | B1* | 6/2015 | Ho | G06F 17/30882 |
| 9,064,493 | B2* | 6/2015 | Ganong, III | G10L 15/1815 |
| 9,087,038 | B1* | 7/2015 | Haldar | H04W 4/18 |
| 9,116,884 | B2* | 8/2015 | Milstein | G06F 17/2872 |
| 9,294,125 | B2* | 3/2016 | Curzi | H03M 7/6088 |
| 9,298,839 | B2* | 3/2016 | Carter | G06F 17/30887 |
| 9,311,286 | B2* | 4/2016 | Bank | G06F 17/2276 |
| 9,390,081 | B2* | 7/2016 | Anders | G06F 17/24 |
| 9,411,900 | B2* | 8/2016 | Vishria | G06F 17/30887 |
| 9,563,604 | B1* | 2/2017 | Lai | G06F 17/21 |
| 9,600,473 | B2* | 3/2017 | Leydon | G06F 17/289 |
| 2002/0138248 | A1* | 9/2002 | Corston-Oliver | G06F 17/271 704/1 |
| 2002/0156618 | A1* | 10/2002 | Mathur | G06F 17/2705 704/9 |
| 2002/0194230 | A1* | 12/2002 | Polanyi | G06F 17/277 704/9 |
| 2003/0037043 | A1* | 2/2003 | Chang | G06F 17/30905 |
| 2004/0122979 | A1 | 6/2004 | Kirkland | |
| 2005/0187757 | A1* | 8/2005 | Mathur | G06F 17/2705 704/9 |
| 2005/0240391 | A1* | 10/2005 | Lekutai | G06F 17/24 704/2 |
| 2006/0253205 | A1* | 11/2006 | Gardiner | G05B 15/02 700/19 |
| 2006/0270425 | A1* | 11/2006 | Lee | H03M 7/30 455/466 |
| 2007/0016401 | A1* | 1/2007 | Ehsani | G06F 17/2872 704/9 |
| 2007/0033005 | A1* | 2/2007 | Cristo | G06F 17/279 704/9 |
| 2008/0114591 | A1 | 5/2008 | Williamson | |
| 2009/0083026 | A1* | 3/2009 | Morsy | G06F 17/30669 704/9 |
| 2010/0057443 | A1* | 3/2010 | Di Cristo | G06F 17/279 704/9 |
| 2010/0064210 | A1* | 3/2010 | Lekutai | G06F 17/24 715/261 |
| 2010/0257182 | A1* | 10/2010 | Saliba | G06F 17/274 707/747 |
| 2011/0107206 | A1* | 5/2011 | Walsh | G06F 17/2785 715/256 |
| 2011/0135071 | A1* | 6/2011 | Milstein | G06F 17/2872 379/88.14 |
| 2012/0054646 | A1* | 3/2012 | Hoomani | A63F 13/79 715/758 |
| 2012/0072204 | A1* | 3/2012 | Nasri | G06F 17/2229 704/9 |
| 2013/0138435 | A1* | 5/2013 | Weber | G06F 17/21 704/231 |
| 2013/0144607 | A1* | 6/2013 | Weber | G06F 17/21 704/9 |
| 2013/0173248 | A1* | 7/2013 | Curzi | H03M 7/607 704/9 |
| 2013/0191738 | A1* | 7/2013 | Bank | G06F 17/2276 715/259 |
| 2013/0191739 | A1* | 7/2013 | Bank | G06F 17/2276 715/259 |
| 2013/0253910 | A1* | 9/2013 | Turner | G06F 17/274 704/9 |
| 2013/0268839 | A1* | 10/2013 | Lefebvre | G06F 17/21 715/234 |
| 2013/0325919 | A1* | 12/2013 | Carter | G06F 17/30887 709/201 |
| 2014/0012580 | A1* | 1/2014 | Ganong, III | G10L 15/1815 704/257 |
| 2014/0029035 | A1* | 1/2014 | Maruyama | G06F 3/1297 358/1.13 |
| 2014/0082104 | A1* | 3/2014 | Mann | H04L 51/046 709/206 |
| 2014/0229154 | A1* | 8/2014 | Leydon | G06F 17/289 704/2 |
| 2014/0303959 | A1* | 10/2014 | Orsini | G06F 17/289 704/2 |
| 2014/0303961 | A1* | 10/2014 | Leydon | G06F 17/28 704/2 |
| 2015/0142704 | A1* | 5/2015 | London | G06N 5/04 706/11 |
| 2015/0143234 | A1* | 5/2015 | Norris, III | G06F 17/24 715/256 |
| 2015/0248883 | A1* | 9/2015 | Ganong, III | G10L 15/1815 704/251 |
| 2016/0041990 | A1* | 2/2016 | Dabah | G06F 17/3061 707/722 |
| 2016/0103808 | A1* | 4/2016 | Anders | G06F 17/24 715/261 |
| 2016/0105386 | A1* | 4/2016 | Anders | G06F 17/24 709/206 |
| 2017/0139958 | A1* | 5/2017 | Bendig | G06F 3/04812 |
| 2017/0228457 | A1* | 8/2017 | Billawal | G06F 17/30719 |
| 2017/0235724 | A1* | 8/2017 | Grewal | G06F 17/274 704/9 |

OTHER PUBLICATIONS

Luke Newton, A Commonplace Blog, "The Power of Twitter", https://lukemichaelnewton.wordpress.com/essay/, Printed May 25, 2016, 6 pages.

Internet Archive Waybackmachine, What is Tweetshort?, http://apps.techglimpse.com/tweetshort/, Copyright 2015 info@techglimpse.com, 1 page.

Why Tall Tweets?, http://talltweets.com/, Copyright 2010-1015, 2 pages.

Xavier Lur, "5 Clever Tools to Shorten Your Tweets", http://techxav.com/5-clever-tools-to-shorten-your-tweets/, Printed Jun. 16, 2016, 3 pages.

MOZ, "Title Tag", https://moz.com/learn/seo/title-tag, Printed Jun. 16, 2016, 1 page.

Dr. Peter J. Meyers, "New Title Tag Guidelines & Preview Tool", https://moz.com/blog/new-title-tag-guidelines-preview-tool, Mar. 20, 2014, 1 page.

* cited by examiner

US 10,210,147 B2

SYSTEM AND METHOD TO MINIMALLY REDUCE CHARACTERS IN CHARACTER LIMITING SCENARIOS

TECHNICAL FIELD

This invention relates generally to character-limited communications and, more specifically, to reducing a character count of a character-limited communication.

BACKGROUND

Recent years have seen the increased prevalence of social media. Social media is a set of computer-mediated tools used by people, companies, and other organizations to create, share, and/or exchange information within virtual communities and networks. Generally, common features of social media applications, websites, and other services include: Web 2.0 Internet-based applications, user-generated content (UGC) (e.g., text, digital photo, and/or digital video posts), user-created profiles for a website or application maintained by a social media organization, and online social networks connecting a user's profile with those of other individuals and/or groups. Social media organizations often use mobile and web-based technologies to create interactive platforms through which users and communities can share, co-create, discuss, and modify user-generated content. For many users, participating in social media offers additional benefits beyond social sharing, including building a reputation and finding career opportunities. Popular social media websites include Facebook (registered trademark of Facebook, Inc.), WhatsApp (registered trademark of WhatsApp Inc.), Tumblr (registered trademark of Tumblr, Inc.), Instagram (registered trademark of Instagram, LLC), Twitter (registered trademark of Twitter, Inc.), and Snapchat (registered trademark of Snapchat, Inc.).

SUMMARY

In general, embodiments described herein provide for reduction of characters in a character-limited scenario by minimally editing a text to remain within a character limit while maintaining a tone of a user's writing. More specifically, as a user enters text into a character-limited field, character reduction opportunities for shortening words or phrases are identified in the text. These identified opportunities for shortening words or phrases are compared with a historical writing tone profile of the user in order to preserve a tone and style of the user. Words or phrases that are presented and implemented to shorten the text entered by the user are only sufficient to bring a character count of the entered text within the character limit of the character-limited field. Once the text is within the character limit, no further character reduction is applied.

One aspect of the present invention includes a computer-implemented method for minimally reducing text characters in a field having a character limit, the computer-implemented method comprising: receiving, by a computer, text, comprising a plurality of textual characters and having a character count, in the field having the character limit; identifying, by the computer, a set of character reduction opportunities in the text, each character reduction opportunity of the set of character reduction opportunities comprising a plurality of characters that can be rewritten as a reduced set of characters; analyzing, by the computer, each reduced set of characters of each character reduction opportunity for conformity with a writing tone profile of a user; creating, by the computer connected to a character reduction database, based on the analyzed conformity with the writing tone profile of the user, a set of character-reduced texts from the received text using at least one analyzed reduced set of characters, the set of character-reduced texts incorporating only a sufficient set of reduced sets of characters that, when traded for a corresponding plurality of characters of the set of character reduction opportunities, brings the character count of the text to within the character limit; presenting, by a user interface, the set of character-reduced texts to bring the character count of the text to within the character limit; receiving, by the computer, a selection of one character-reduced text of the set of character-reduced texts; replacing, by the computer, the text with the selected character-reduced text; and submitting, by the computer, the character-reduced text.

Another aspect of the present invention includes a computer system for minimally reducing text characters in a field having a character limit, the computer system comprising: a memory medium comprising program instructions; a bus coupled to the memory medium; and a processor, for executing the program instructions, coupled to a minimal character reduction engine via the bus that when executing the program instructions causes the system to: receive text, comprising a plurality of textual characters and having a character count, in the field having the character limit; identify a set of character reduction opportunities in the text, each character reduction opportunity of the set of character reduction opportunities comprising a plurality of characters that can be rewritten as a reduced set of characters; analyze each reduced set of characters of each character reduction opportunity for conformity with a writing tone profile of a user; create, based on the analyzed conformity with the writing tone profile of the user, a set of character-reduced texts from the received text using at least one analyzed reduced set of characters, the set of character-reduced texts incorporating only a sufficient set of reduced sets of characters that, when traded for a corresponding plurality of characters of the set of character reduction opportunities, brings the character count of the text to within the character limit; present the set of character-reduced texts to bring the character count of the text to within the character limit; receive a selection of one character-reduced text of the set of character-reduced texts; replace the text with the selected character-reduced text; and submit the character-reduced text.

Yet another aspect of the present invention includes a computer program product for minimally reducing text characters in a field having a character limit, the computer program product comprising a computer readable storage device, and program instructions stored on the computer readable storage device, to: receive text, comprising a plurality of textual characters and having a character count, in the field having the character limit; identify a set of character reduction opportunities in the text, each character reduction opportunity of the set of character reduction opportunities comprising a plurality of characters that can be rewritten as a reduced set of characters; analyze each reduced set of characters of each character reduction opportunity for conformity with a writing tone profile of a user; create, based on the analyzed conformity with the writing tone profile of the user, a set of character-reduced texts from the received text using at least one analyzed reduced set of characters, the set of character-reduced texts incorporating only a sufficient set of reduced sets of characters that, when traded for a corresponding plurality of characters of the set of character reduction opportunities, brings the character count of the text to within the character limit; present the set of character-reduced texts to bring the character count of the text to within the character limit; receive a selection of one character-reduced text of the set of character-reduced texts; replace the text with the selected character-reduced text; and submit the character-reduced text.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

Figure 1:
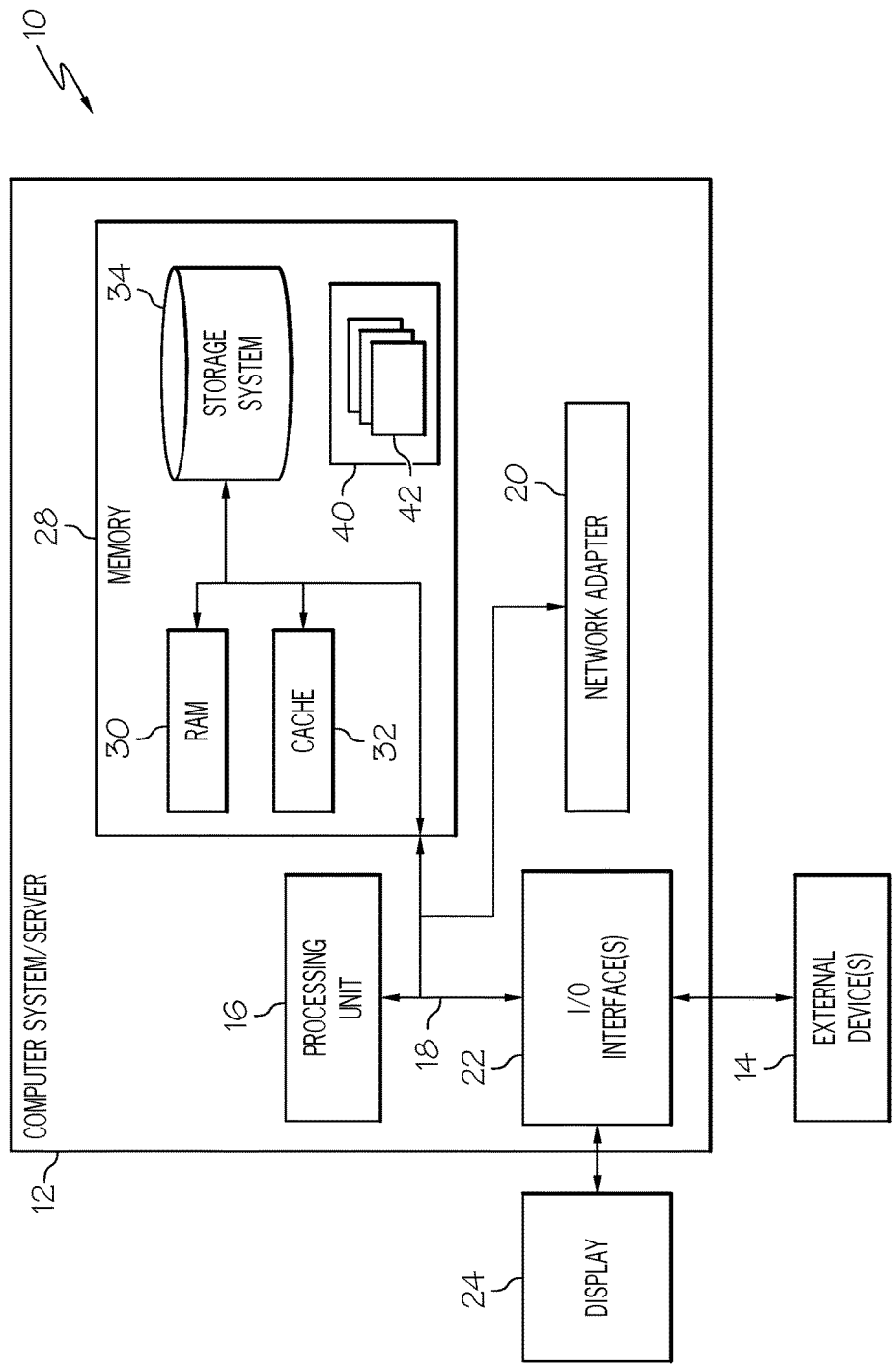
FIG. 1 shows an architecture in which the invention may be implemented according to illustrative embodiments.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which illustrative embodiments are shown. It will be appreciated that this disclosure may be embodied in many different forms and should not be construed as limited to the illustrative embodiments set forth herein.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. Furthermore, similar elements in different figures may be assigned similar element numbers. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing," "detecting," "determining," "evaluating," "receiving," or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission or viewing devices. The embodiments are not limited in this context.

As stated above, embodiments described herein provide for reduction of characters in a character-limited scenario by minimally editing a text to remain within a character limit while maintaining a tone of a user's writing. More specifically, as a user enters text into a character-limited field, character reduction opportunities for shortening words or phrases are identified in the text. These identified opportunities for shortening words or phrases are compared with a historical writing tone profile of the user in order to preserve a tone and style of the user. Words or phrases that are presented and implemented to shorten the text entered by the user are only sufficient to bring a character count of the entered text within the character limit of the character-limited field. Once the text is within the character limit, no further character reduction is applied.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node for minimally reducing text characters in a character-limited field is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

Further, referring to FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 16 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 16 collects and routes signals representing inputs and outputs between external devices 14 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 16 executes computer program code, such as program code for minimally reducing text characters in a character-limited field, which is stored in memory 28, storage system 34, and/or program/utility 40. While executing computer program code, processing unit 16 can read and/or write data to/from memory 28, storage system 34, and program/utility 40.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media (e.g., VCRs, DVRs, RAID arrays, USB hard drives, optical disk recorders, flash storage devices, and/or any other data processing and storage elements for storing and/or processing data). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
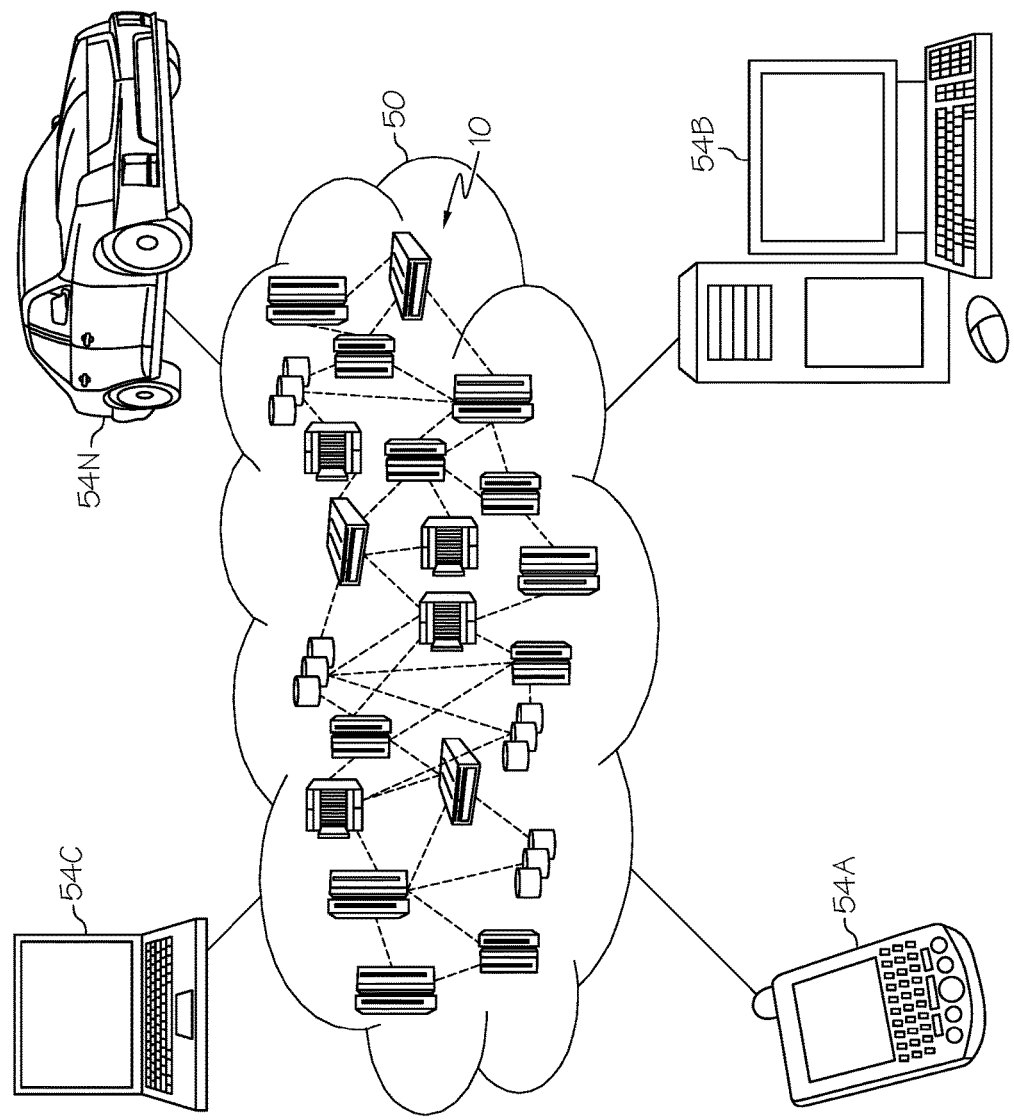
FIG. 2 depicts a cloud computing environment according to illustrative embodiments of the present invention.

Referring now to FIG. 2, illustrative cloud computing environment 50 is depicted. Cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
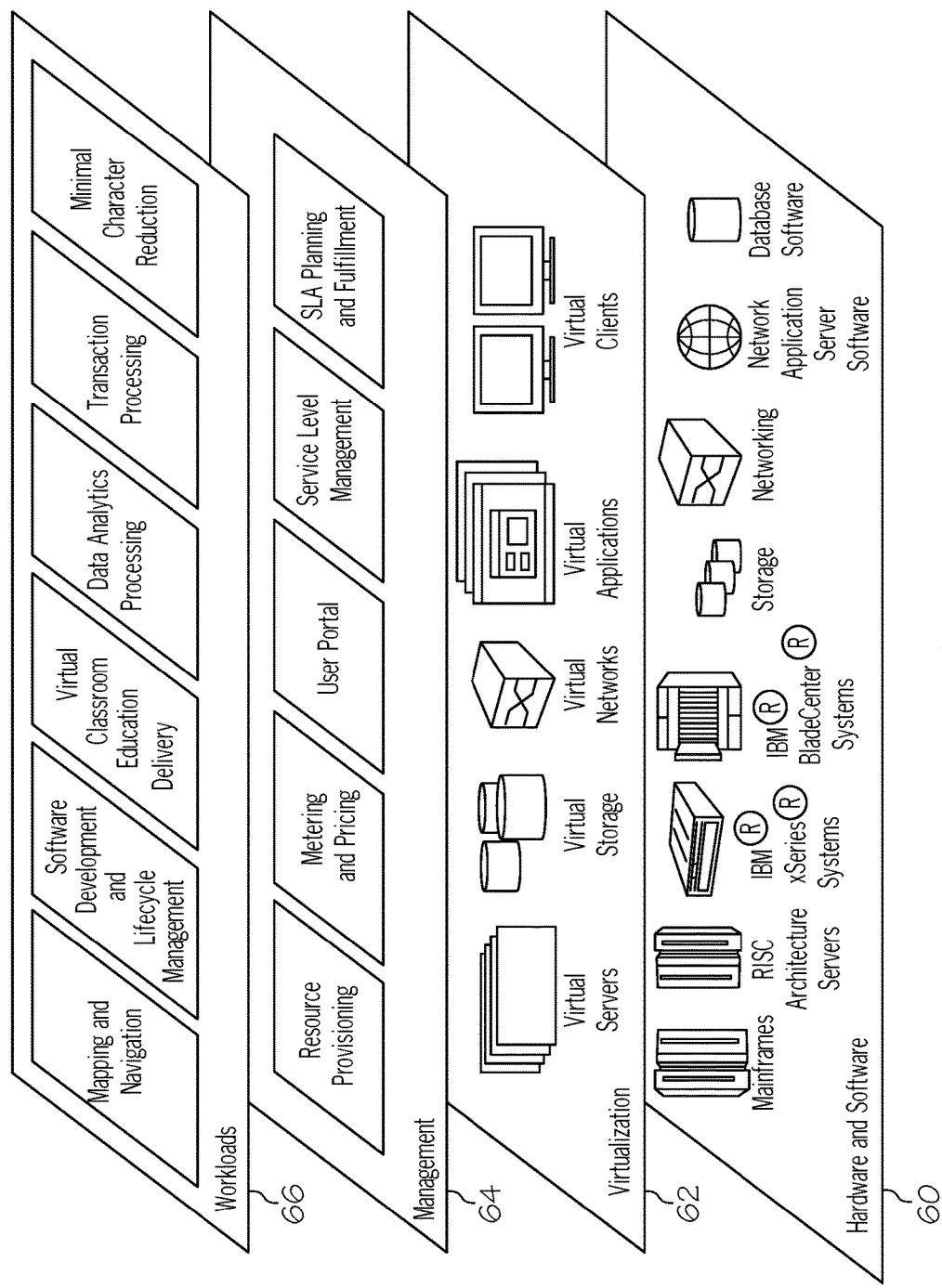
FIG. 3 depicts abstraction model layers according to illustrative embodiments of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM System X® servers, IBM BladeCenter® systems, storage devices, networks, and networking components. Examples of software components include network application server software. In one example, IBM WebSphere® application server software and database software. In one example, IBM DB2® database software. (IBM, zSeries, pSeries, System x, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may include application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and minimal character reduction. As mentioned above, all of the foregoing examples described with respect to FIG. 3 are illustrative only, and the invention is not limited to these examples.

It is understood that all functions of the present invention as described herein typically may be performed by the minimal character reduction functionality (of workload layer 66, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, some embodiments of the present invention are intended to be implemented with any type of networked computing environment now known or later developed.

The inventors of the present invention have found that many content delivery websites, applications, and other services, such as social media, impose a limitation on a number of characters that a message or other textual user input, can contain. For example, a short message service (SMS) message has a limit of 160 characters, a Twitter (registered trademark of Twitter, Inc.) message has a limit of 140 characters, a Google (registered trademark of Google, Inc.) search engine title has a limit of 50-60 characters, an eBay (registered trademark of eBay Inc.) title has a limit of 80 characters, a Craigslist (registered trademark of Craigslist Inc.) title has a limit of 70 characters, and on LinkedIn (registered trademark of LinkedIn Corp.), a first name has a limit of 20 characters, a last name has a limit of 40 characters, a headline has a limit of 120 characters, and a position title has a limit of 100 characters.

In spite of these character limitations, a user or message author may desire to write more text than permitted in an input field. The inventors of the present invention have found that current approaches for shortening messages in a character-limited scenario are deficient. For example, in the current art, a user or message author must continuously and manually truncate his or her entry in a text field to keep an entry under a character limit. This can cause a user to lose his/her train of thought as the user attempts to remove characters while writing. Furthermore, reducing characters can change a tone of an original message, causing a user to sound unprofessional or immature and/or causing the meaning or tone of the message to be lost. Alternatively, a user may attempt to rewrite or modify a message after a first submission fails, shortening the message over and over again until a submission completes. Even when a user attempts to apply existing message shortening tools to a message, the existing tools shorten all parts of the message, and the tone and feel of the message is lost. Accordingly, the inventors have discovered a way to reduce long or excessive messages so that the message fits within a character limitation requirement, while preserving a tone of a user or message author.

The inventors of the present invention have discovered a system and method for minimally and optimally reducing a message or other inputted text, during composition, to below a character limitation threshold imposed by a website, application, or other service. Embodiments of the present invention offer several advantages, including, but not limited to, maintaining an author's original tone, adjusting character reduction as an author writes, and enhancing and optimizing user experiences by not requiring a user to consciously limit characters while typing. Embodiments of the present invention reduce the characters in a message to fit within a prescribed length by removing as little material as required from the original content. In other words, embodiments of the present invention provide the ability to reduce a character count on an "as needed" basis, while preserving the context and tone of an original message.

Figure 4:
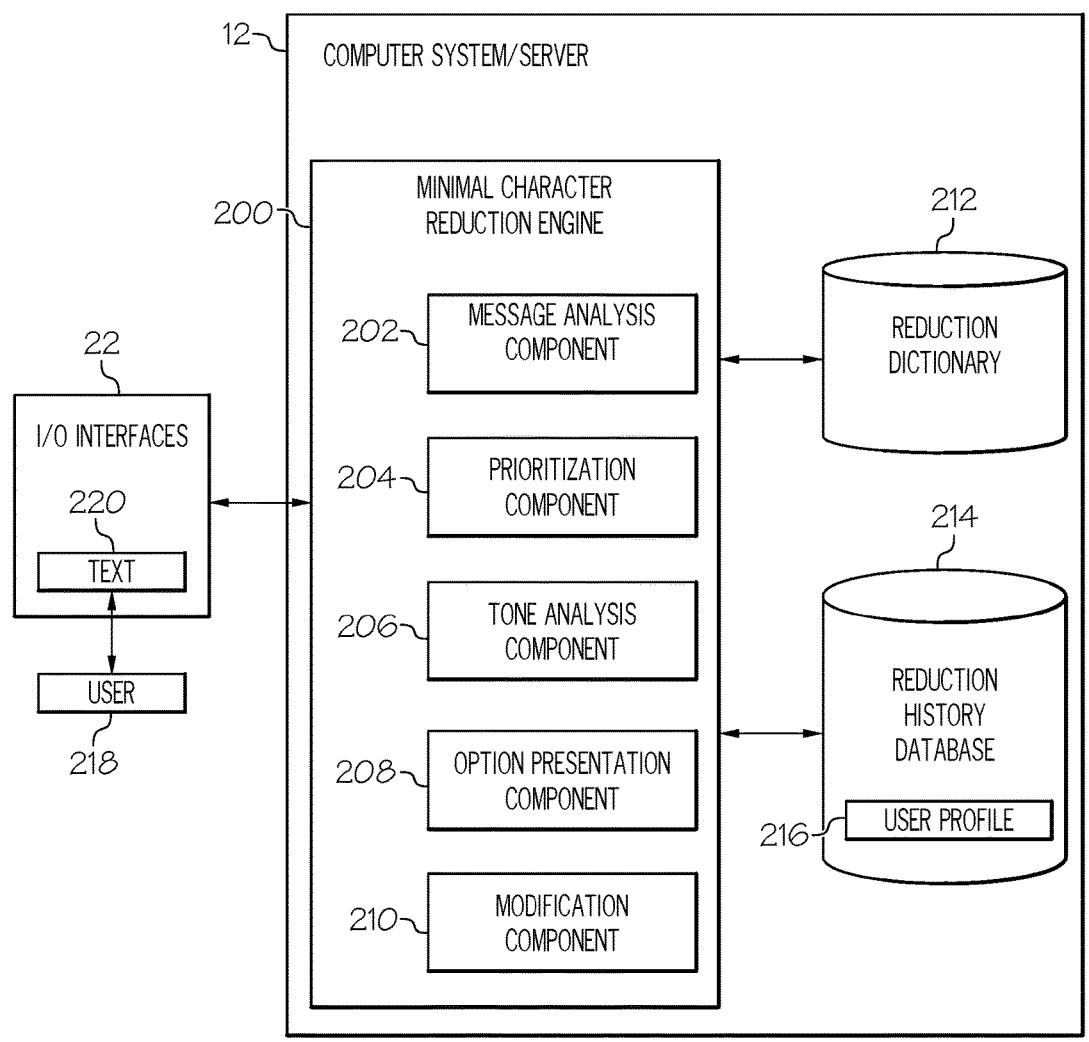
FIG. 4 shows a more detailed system architecture for a device implementing a minimal character reduction according to illustrative embodiments.

Referring now to FIG. 4, a more detailed system architecture for a device implementing a minimal character reduction according to illustrative embodiments is shown. Computer system/server 12 (FIG. 1) can contain a minimal character reduction engine 200 having program instructions for carrying out embodiments of the present invention. In some embodiments, minimal character reduction engine 200 can be program/utility 40 of FIG. 1. Minimal character reduction engine 200 can contain a set of components for carrying out embodiments of the present invention, including message analysis component 202, prioritization component 204, tone analysis component 206, option presentation component 208, and modification component 210. Minimal character reduction engine 200 can further contain, or be in communication with, reduction dictionary 212 and reduction history database 214. In some embodiments, reduction dictionary 212 and/or reduction history database 214 can, for example, be part of storage system 34 of FIG. 1 or reside on a remote storage location, such as a cloud server. Computer system 12 can further contain or be in communication with I/O interfaces 22 in which user 218 enters text 220 or otherwise authors a message. In some embodiments, I/O interfaces 22 may be incorporated in or in communication with a user device (e.g., a touch screen on a mobile phone).

Figure 5:
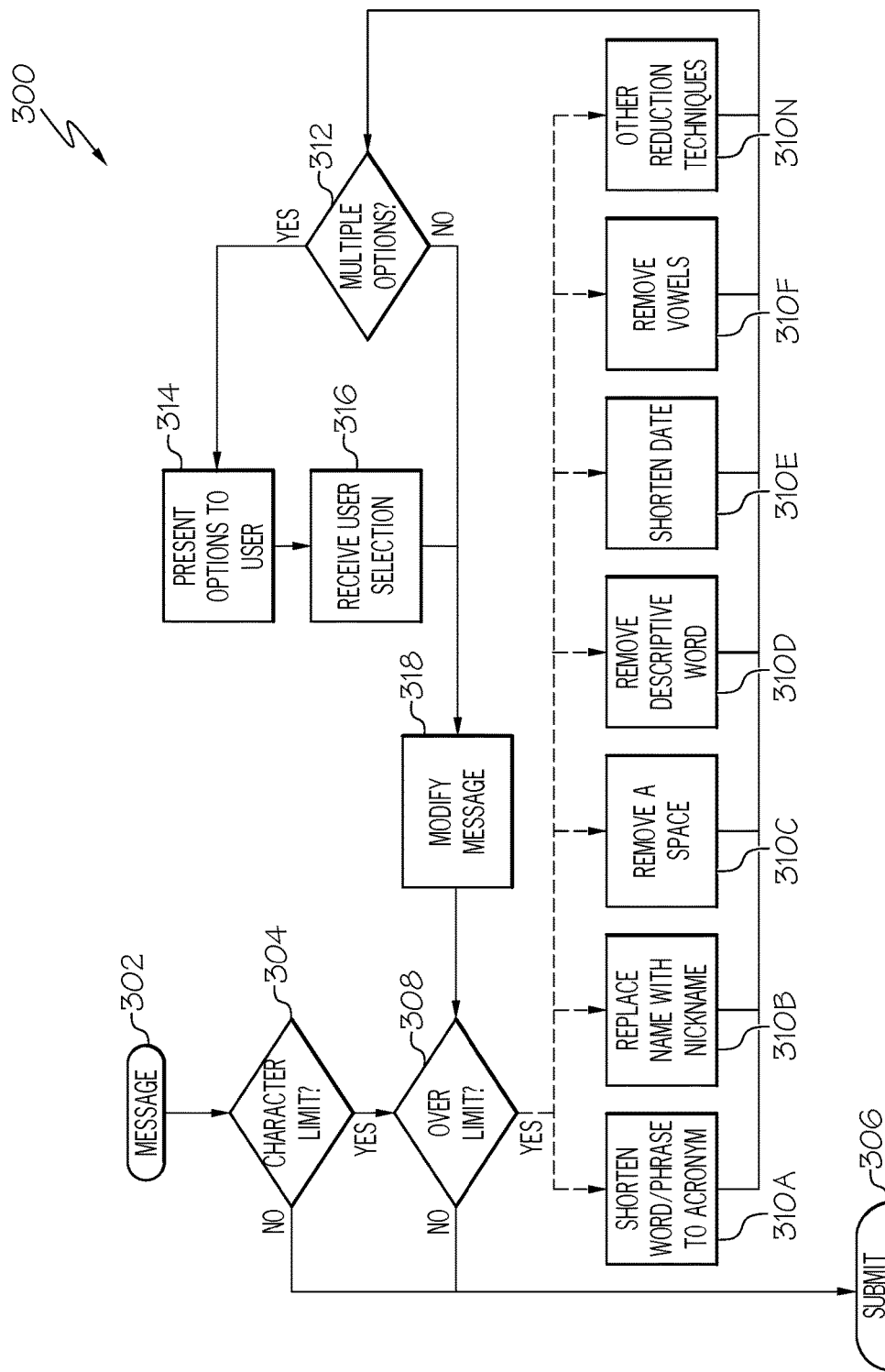
FIG. 5 shows a process for minimally and optimally reducing text characters in a character-limited field according to illustrative embodiments.

Referring now to FIG. 5 along with FIG. 4, an implementation of a process 300 for minimally and optimally reducing text characters in a character-limited field will be shown and discussed. Process 300 can be initiated when user 218 begins to craft a message or other textual input 302 by entering text 220 into an input interface 22 connected to an application, a website, or other service. User 218 may craft a message in any manner now known or later developed, such as, but not limited to, typing on a keyboard, interacting with a virtual keyboard with a stylus, finger, or mouse, or dictating a message using speech-to-text technology.

As user 218 enters text 220 of message 302 in a text field of an application, a website, or other service, message analysis component 202 of minimal character reduction engine 200 determines at 304 if there is a limitation on a number of characters that user 218 can enter. This determination may be accomplished by any way now known or later developed. For example, message analysis component 202 can check if user 218 is entering text 220 in an application or other service that has a known character limit, such as a text messaging application. In another embodiment, message analysis component 202 can also check for metadata indicating a character limit associated with a field into which user 218 is entering text 220. In yet another embodiment, user 218 may input a character limit into minimal character reduction engine 200 for a particular field. If message analysis component 202 determines that there is no character limit for the text field of the application, website, or other service, then process 300 ends and user 218 may submit message or other textual input 302 at step 306 without further processing.

However, if message analysis component 202 determines that the text field, into which user 218 is entering text 220 of message 302, has a character limit, then message analysis component 202 further determines at step 308 if message 302 is over the character limit. Message analysis component 202 can dynamically monitor text 220 of message 302 and if and/or when text 220 exceeds the character limit, trigger a minimal character reduction process. In some embodiments, this minimal character reduction process can be applied while user 218 is still entering text 220. In some other embodiments, the minimal character reduction process can be triggered after user 218 finishes entering text 220 exceeding the character limit and attempts to submit the text.

In the event that text 220 exceeds the character limit, message analysis component 202 searches message 302 for character reduction opportunities at one or more of steps 310A-N. A character reduction opportunity is a group of characters, such as a word or phrase, which can be rewritten with fewer characters, such as an abbreviation or nickname. Message analysis component 202 can use reduction dictionary 212 to recognize reduction opportunities. Reduction dictionary 212 can include any database or data store that contains information or cross-references on words or phrases that can be rewritten as shorter words or phrases. In some embodiments, user 218 can add full words and/or phrases with corresponding shorter equivalents of the words and/or phrases to reduction dictionary 212 in order to personalize reduction dictionary 212. User 218 may directly add these entries to reduction dictionary 212, or minimal character reduction engine 200 may review messages of user 218 for frequently used abbreviations or other shortened words or phrases and enter these into reduction dictionary 212.

One example of a reduction opportunity is shortening a word or phrase to an abbreviation or acronym (e.g., "laugh out loud" becomes "LOL," "California" becomes "CA," "San Francisco" becomes "San Fran" or "SF") as shown at step 310A. Another example of a reduction opportunity is replacing a full name with a common nickname (e.g., "IBM PureApplication System" becomes "PureApp," "Interstate 40" becomes "I40," "Las Vegas" becomes "Vegas") as shown at step 310B. Yet another example of a reduction opportunity is removing spaces (e.g., changing double spaces after punctuation to single spaces) as shown at step 310C. Still another example of a reduction opportunity is removing or shortening descriptive words or modifiers 310D, such as adjectives, adverbs, and prepositional phrases (e.g., "hairy green monster" becomes "monster," "in the afternoon" becomes "PM") as shown at step 310D. Another example of a reduction opportunity is shortening dates (e.g., "next year" becomes "2017," "January 25th, 2015" becomes "Jan 25$^{th}$" or "1/25") as shown at step 310E. Yet another example of a reduction opportunity is removing vowels, and particularly removing vowels beginning with more common words ("next" becomes "nxt" before "Elizabeth" is shortened to "lzbth"), as shown at step 310F. While these character reduction technique steps are provided as examples, they are not intended to be limiting, and it should be understood that any other technique now known or later developed for reducing a character count may be implemented at step 310N.

Prioritization component 204 can control an order of priority in which message analysis component 202 identifies reduction opportunities and minimal character reduction engine 200 implements character reductions. For example, prioritization component 204 can determine which reduction opportunities message analysis component 202 can analyze text 220 of message 302 for and in what order. In some embodiments, user 218 may set the order of priority. For example, minimal character reduction engine 200 could be configured to permit user 218 to select an order of character reduction attempts (e.g., a user selects to shorten dates before shortening words/phrases to abbreviations). In other embodiments, prioritization component 204 can store a history of character reductions in reduction history database 214. For example, each time a user 218 selects a particular character reduction to modify message 302 with, prioritization component 204 can create an entry in reduction history database 214 with information about the selected reduction, including a type of reduction (e.g., abbreviation, nickname, shorter date format). A count of each category of character reduction can be kept by prioritization component 204 in order to learn what types of character reduction user 218 prefers and to prioritize those types of character reductions first.

Information saved in reduction history database 214 can form the basis of character reduction profile 216 of user 218. Profile 216 can contain information on what kinds of character reductions user 218 is most likely to use and/or prefers. As such, prioritization component 204 can use profile 216 to present user 218 with character reductions that best fit the writing style and phrasing preferences of user 218. In order to accomplish this, tone analysis component 206 gathers historical tone data from a set of previous messages of user 218 and performs sentiment analysis and/or tone analysis on potential character reduction opportunities. Previous messages can include messages in which user 218 entered his/her own shortened words/phrases, even when shortening was not required (e.g., a user regularly uses "LOL" instead of "lots of laughs"). These previous messages can also include messages in which minimal character reduction engine offered user 218 one or more character reduction options and user 218 accepted or rejected certain options (e.g., a user who tends to select date shortening modifications before word/phrase abbreviations).

In some embodiments, tone analysis component 206 can perform sentiment analysis and/or tone analysis on a current message or other text 302 being entered by user 218. In one embodiment, tone analysis component 206 can perform sentiment analysis and/or tone analysis using existing techniques, such as IBM's Watson Tone Analysis service (IBM and Watson are trademarks of IBM Corporation) which uses linguistic analysis to detect three types of tones from written text: emotions (e.g., anger, fear, joy, sadness, and disgust), social tendencies (e.g., openness, conscientiousness, extraversion, agreeableness, and emotional range), and writing style (e.g., confident, analytical, and tentative).

Tone analysis services, such as IBM's Watson Tone Analysis service, compute/determine language tones using linguistic analysis that studies correlation between various tones and linguistic features in written text to infer a user's personality characteristics, thinking and writing styles, emotions, and intrinsic needs and values. For example, the frequency with which a user uses certain types of words can provide clues to personality, thinking style, social connections, and emotional states. Tone analysis builds on these clues to infer tone from text by learning various features from text inputted to machine learning models. For example, to derive an emotion score from text, a stacked generalization-based ensemble framework can be used where text features, such as n-grams (unigrams, bigrams and trigrams), punctuation, emoticons, offensive words, greeting words (such as hello, hi, and thanks), and sentiment polarity, are entered into machine learning algorithms to classify emotion categories. In another example, social tone can be derived by testing text against a pre-existing databank of social tone information gathered by administering personality surveys to subjects. In yet another example, language tone/writing style can be calculated from a linguistic analysis based on features learned by administering response surveys to subjects reading passages with different language tones.

As message analysis component 202 searches message 302 for reduction opportunities, in a prioritized order as dictated by prioritization component 204, tone analysis component 206 compares the reduction opportunities to historic tone information and/or to an original tone of message 302 entered by user 218. If tone information matches (e.g., same/similar emotions, social tendencies, and/or writing styles) and/or complies with a message shortening technique of the reduction opportunity (e.g., a same type of shortening category, a same shortening format, a same shortened word/phrase), then the tone shortening technique can be automatically applied and can be visually highlighted so that user 218 may view the modification. In another embodiment, the tone shortening technique can be suggested to user 218 (as will be further described below). Moreover, if a particular tone shortening technique or pattern is more common to user 218 than others, tone analysis component 206 can assign that tone shortening technique a higher priority in user profile 216 for subsequent messages that require shortening. Conversely, if the tone information does not match a message shortening technique of the reduction opportunity (e.g., removing many vowels in order to stay within a character count threshold, but user 218 rarely uses that technique), then tone analysis component 206 can instruct message analysis component 202 to look for reduction opportunities that use other shortening techniques first. Furthermore, if no additional message shortening techniques can be used to place message 302 below a character threshold, then tone analysis component 206 can issue a warning to user 218, informing him/her of the tone change. For example, if a change in tone exceeds a threshold tone change (e.g., 50%), tone analysis component 206 can issue a tone change warning. In addition, as user 218 continues to interact with minimal character reduction engine 200 and write messages or other text, tone profile 216 changes, allowing minimal character reduction engine 200 to learn about intended tone patterns of user 218.

Additionally, prioritization component 204 can be configured (e.g., by a user or automatically) to permit message analysis component 202 to determine several alternative character reductions for shortening message 302. For example, in some embodiments, message analysis component 202 can identify several alternative character reduction opportunity options. In other embodiments, prioritization component 204 can instead choose a best character reduction option for user 218 based on user profile 216 and the prioritized types of character reductions. In any case, in some embodiments, at step 312, option presentation component 208 determines if there are multiple character reduction options. If so, option presentation component 208 of minimal character reduction engine 200 can present user 218 with a set of possible character reduction options at step 314. For example, option presentation component 208 can create a set of mockups of the possible options and display each for user 218 to choose from at step 316. In some embodiments, differences between different reduction options can be highlighted to more easily identify character reduction alternatives. User 218 may select which character reduction option he/she prefers.

In any case, whether user 218 selects an option or whether minimal character reduction engine 200 selects a best character reduction for user 218, at step 318 modification component 210 modifies message 302 to replace part of message 302 with the character reduction. As referenced above, in some embodiments, modification component 210 or tone analysis component 206 can prompt user 218 with a warning about perceived tone changes, if a character reduction method would modify a tone of message 302.

After message 302 is modified with a character reduction, message analysis component 202 can check at 308 whether modified message 302 is under the character limit or threshold imposed by the field into which user 218 is entering text 220. If modified message 302 is still over the character limit, the above described process can repeat, with prioritization component 204 permitting message analysis component 202 to search for lower priority reduction opportunities. Likewise, if user 218 adds additional characters, minimal character reduction engine 200 can reanalyze message 302 and replace a word/phrase in message 302 with character reduced text. If message analysis component 202 determines that message 302 is under the character limit, then message analysis component 202 permits user 218 to submit/transmit/enter modified message 302 at 306. Once message 302 is under the character limit, process 300 for minimally reducing text characters in a character-limited field stops. This results in only a minimal number of modifications to message 302 in order to best preserve the original text and tone of message 302 by user 218.

Additionally, in some embodiments, if user 218 removes characters/words/phrases of modified message 302, minimal character reduction engine 200 can present user 218 with the opportunity to undo previous character reductions. For example, if "San Francisco" was previously shortened to "SF", but then user 218 removed eleven or more characters from modified message 302, user 218 may choose to reverse or undo the shortening and replace "SF" with "San Francisco," as originally written by user 218.

In some embodiments, message analysis component 202 of minimal character reduction engine 200 can be configured (e.g., by a user or automatically) to determine if it is not possible or practical to shorten message 302 to under a character limit of an input field. User 218 may configure minimal character reduction engine 200 with a maximum threshold character reduction in order to prevent overabundant character reductions that cause a tone or meaning of message 302 to be significantly lost. For example, if message analysis component 202 determines that a pre-set maximum reduction threshold or more (e.g., more than 50%) of message 302 would need to be reduced in order to place message 302 under the character limit, then minimal character reduction engine 200 can present an error message to user 218 or advise user 218 to separate message 302 into two or more separate messages.

Figure 6A:
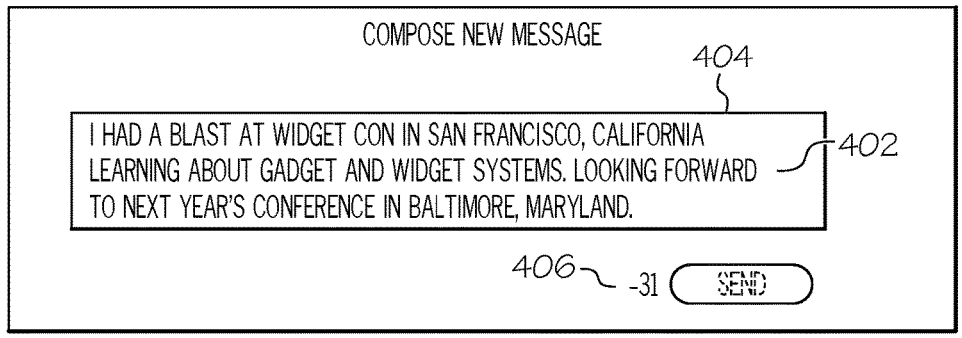
FIGS. 6A, 6B, 6C, and 6D show illustrative examples of minimal character reduction according to illustrative embodiments.

Referring now to FIGS. 6A, 6B, 6C, and 6D, with reference to FIG. 4 and FIG. 5, an illustrative example of minimal character reduction is presented. Referring to FIG. 6A, when user 218 enters message 402 into character-limited interface 404 of a website, application, or other service (e.g., a Twitter messaging service), user 218 would, in present social media applications, see indication 406 that message 402 has reached or exceeded a character limitation. Further, user 218 would find that submitting the message has been disabled until message 402 is shortened to within the character limitation or that message 402 has been broken into two separate messages.

Figure 6B:
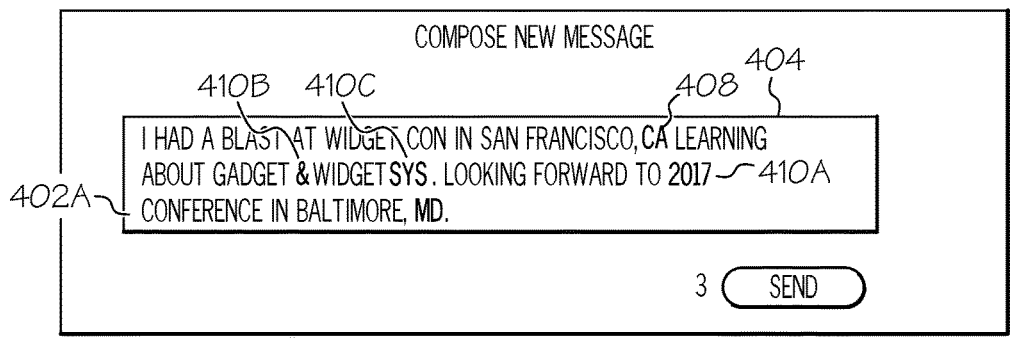

Referring now to FIG. 6B, in embodiments of the present invention, as user 218 enters message 402 into character-limited interface 404, message analysis component 202 reviews message 402 for exceedance of the character limit. When message analysis component 202 flags message 402 as over the character limit, prioritization component 204 can determine which character reduction techniques should be implemented first based on a priority configuration by user 218, a user history stored in reduction history database 214, and/or user profile 216 of user 218. For example, user 218 may configure minimal character reduction engine 200 to reduce location words or phrases to abbreviations 408, such as "California" to "CA" or "Maryland" to "MD," before implementing any other types of character reductions. Message analysis component 202 can check if these character reductions are sufficient to reduce message 402 to below the character limit. If not, message analysis component 202 can search for additional character reduction opportunities 410A-C, such as a date 410A, a word or phrase that can be expressed with a symbol 410B, and/or other abbreviations 410C. Modification component 210 can then implement these modifications and display modified message 402A in interface 404. Once message 402A is under the character limit the reduction process stops. Although there may be additional reduction opportunities in message 402A, such additional reduction opportunities are not necessary to keep message 402A under the character limit, and, therefore, are not implemented.

Figure 6C:

Referring now to FIG. 6C, in some embodiments of the present invention, user 218 can configure minimal character reduction engine 200 to present user 218 with character reduction options 412. In some other embodiments, minimal character reduction engine 200 can automatically present user 218 with character reduction options 412, for example, in response to two or more character reduction options having a same level of priority. In any case, option presentation component 208 can display options 412 in interface 404 or in an additional interface in the same application, website, or other service as interface 404. In some embodiments, differences between different options 412 can be marked with highlighting 414 in order to show user 218 how options 412 differ from one another. User 218 can make a selection between character reduction options 412. Modification component 210 can then replace a portion or all of message 402 with the selected character reduction, which user 218 may then send/post/etc. Prioritization component 204 can also save the selected character reduction in reduction history database 214 and add the selection to user profile 216.

Figure 6D:
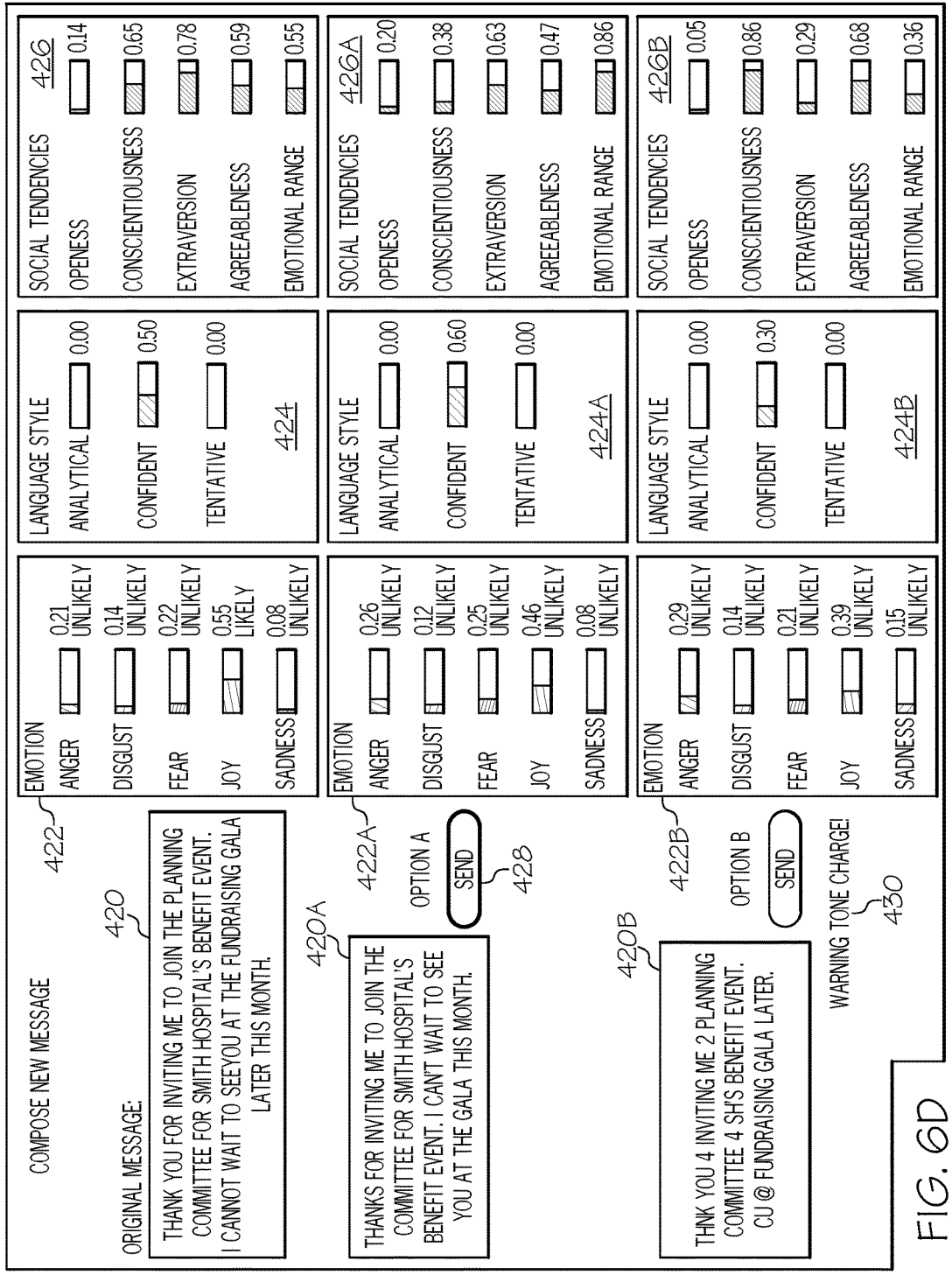

Referring now to FIG. 6D, in some embodiments of the present invention, tone analysis component 206 can analyze a sentiment and/or tone of original message 420. For example, analysis component 206 could assess that original message 420 shows joyous emotion 422, confident style 224, and extraversion social tendencies 426. If message analysis component 202 finds several character reduction options 420A-B, tone analysis component 206 can analyze options 420A and 420B for a sentiment and/or tone, such as emotions 422A-B, language styles 424A-B, and/or social tendencies 426A-B. Tone analysis component 206 can further compare sentiment and/or tone information of options 420A-B to that of original message 420 and/or to that of user profile 216. In the example shown in FIG. 6D, tone analysis component 206 can make recommendation 428 that user 218 should select option 420A because its analyzed sentiment and/or tone information (e.g., emotion 422A, style 424A, and social tendencies 426A) is a better fit with the sentiment and/or tone information (e.g., emotion 422, style 424, and social tendencies 426) of original message 420, as compared with option 420B. In another example, tone analysis component 206 can recommend that user 218 select option 420A because its analyzed sentiment and/or tone information (e.g., emotion 422A, style 424A, and social tendencies 426A) is a better fit with the sentiment and/or tone information of user profile 216, as compared with option 420B. In still another example, tone analysis component 206 can issue a warning or alert 430 to user 218 if any character reduction options 420A-B would result in a significant change in tone (e.g., more than a 25% change in tone measurements).

Figure 7:
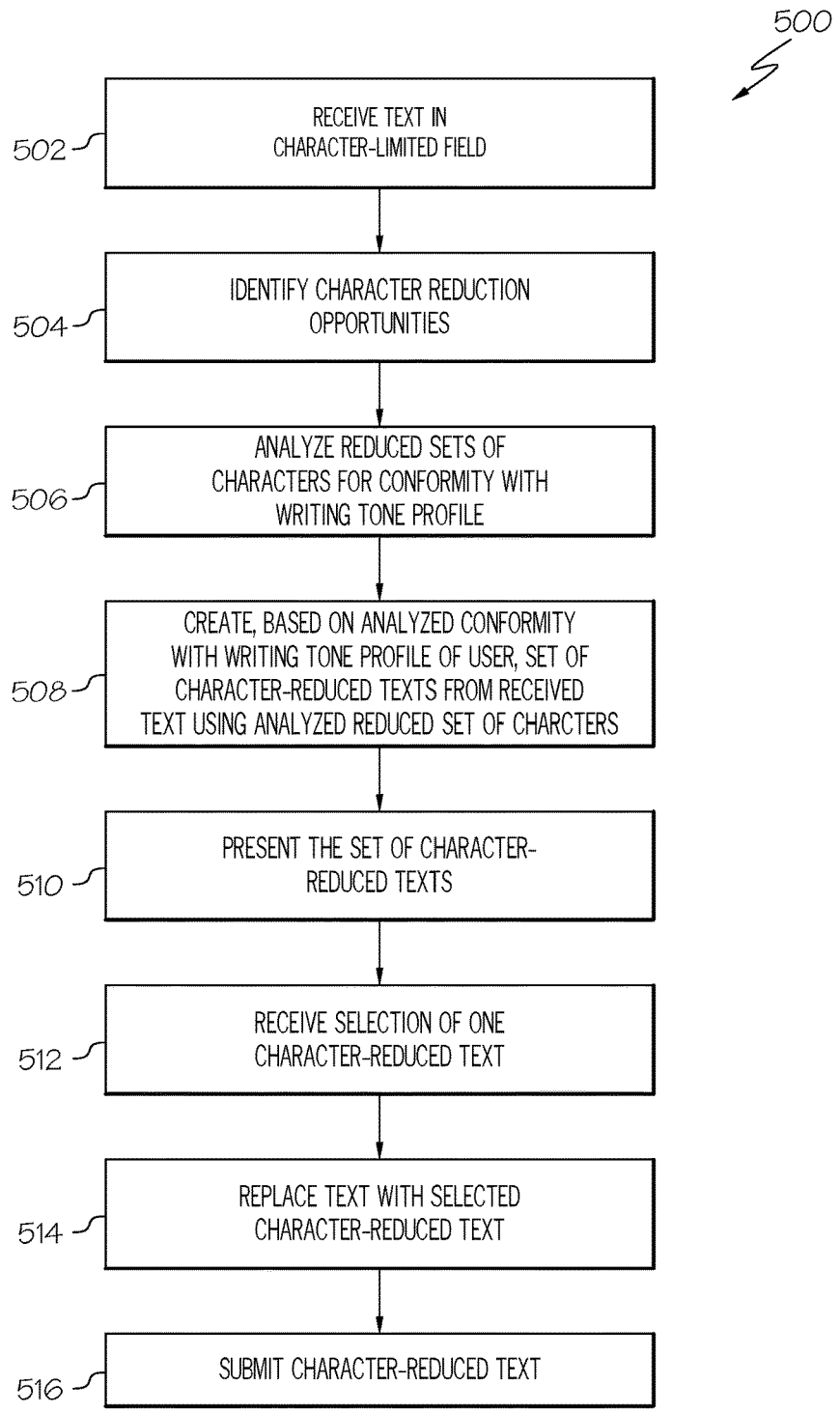
FIG. 7 shows a process flowchart for minimally reducing text characters in a character-limited field according to illustrative embodiments.

As depicted in FIG. 7, in one embodiment, a system (e.g., computer system 12) carries out the methodologies disclosed herein. Shown is a process flowchart 500 for minimally reducing text characters in a field having a character limit. At step 502, text is received, comprising a plurality of textual characters and having a character count, in the field having the character limit. At step 504, a set of character reduction opportunities are identified in the text, each character reduction opportunity of the set of character reduction opportunities comprising a plurality of characters that can be rewritten as a reduced set of characters. At step 506, each reduced set of characters of each character reduction opportunity is analyzed for conformity with a writing tone profile of a user. At step 508, a set of character-reduced texts is created from the received text using at least one analyzed reduced set of characters, based on the analyzed conformity with the writing tone profile of the user, the set of character-reduced texts incorporating only a sufficient set of reduced sets of characters that, when traded for a corresponding plurality of characters of the set of character reduction opportunities, brings the character count of the text to within the character limit. At step 510, the set of character-reduced texts to bring the character count of the text to within the character limit is presented. At step 512, a selection of one character-reduced text of the set of character-reduced texts is received. At step 514, the text is replaced with the selected character-reduced text. At step 516, the character-reduced text is submitted.

Process flowchart 500 of FIG. 7 illustrates the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, program/utility 40 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Any of the components provided herein can be deployed, managed, serviced, etc., by a service provider that offers to deploy or integrate computing infrastructure with respect to a process for minimally reducing text characters in a character-limited field. Thus, embodiments herein disclose a process for supporting computer infrastructure, comprising integrating, hosting, maintaining, and deploying computer-readable code into a computing system (e.g., computer system 12), wherein the code in combination with the computing system is capable of performing the functions described herein.

In another embodiment, the invention provides a method that performs the process steps of the invention on a subscription, advertising, and/or fee basis. That is, a service provider, such as a Solution Integrator, can offer to create, maintain, support, etc., a process for minimally reducing text characters in a character-limited field. In this case, the service provider can create, maintain, support, etc., a computer infrastructure that performs the process steps of the invention for one or more customers. In return, the service provider can receive payment from the customer(s) under a subscription and/or fee agreement, and/or the service provider can receive payment from the sale of advertising content to one or more third parties.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is apparent that there has been provided herein approaches to minimally reducing text characters in a character-limited field. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A computer-implemented method for minimally reducing text characters in a field having a character limit, the computer-implemented method comprising:

receiving, by a computer, text, comprising a plurality of textual characters and having a character count, in the field having the character limit;

analyzing, by the computer, the text for an emotional tone and a social tendencies tone, the analysis comprising: applying a machine learning algorithm that classifies a set of emotion categories to the text to produce an emotional tone score, and testing the text against a social tone databank to produce a social tone score;

identifying, by the computer, a set of character reduction opportunities in the text, each character reduction opportunity of the set of character reduction opportunities comprising a plurality of characters that can be rewritten as a reduced set of characters;

analyzing, by the computer, each reduced set of characters of each character reduction opportunity for conformity with a writing tone profile of a user, the writing tone profile of the user comprising an ordered priority of character reduction techniques;

creating, by the computer connected to a character reduction database, based on the analyzed conformity with the writing tone profile of the user, a plurality of character-reduced texts from the received text using at least one analyzed reduced set of characters in each of the plurality of character-reduced texts, wherein the creating comprises matching an emotional tone or a social tendency tone of the received text in at least one of the plurality of character-reduced texts, wherein the plurality of character-reduced texts each incorporated only a sufficient set of reduced sets of characters that, when traded for a corresponding plurality of characters of the set of character reduction opportunities, brings the character count of the text to within the character limit, and wherein the set of character reduction opportunities in the text are identified and applied to the plurality of character-reduced texts according to the ordered priority;

analyzing each of the plurality of character-reduced texts for an emotional tone and a social tendencies tone, the analysis comprising: applying a machine learning algorithm that classifies a set of emotion categories to the character-reduced text to produce a character-reduced text emotional tone score, and testing the character-reduced text against a social tone databank to produce a character-reduced text social tone score;

presenting, by a user interface, the plurality of character-reduced texts to the user to bring the character count of the text to within the character limit, the presenting comprising displaying a comparison of the emotional and social tone scores associated with the received text against the emotional and social tone scores associated with each character-reduced text of the plurality of character-reduced texts;

receiving, by the computer, a selection by the user of one character-reduced text of the plurality of character-reduced texts;

replacing, by the computer, the text with the selected character-reduced text;

submitting, by the computer, the character-reduced text; and adding the character-reduced text selection by the user to the writing tone profile of the user.

2. The computer-implemented method of claim 1, the replacing the text further comprising modifying the text by trading the corresponding plurality of characters of the set of character reduction opportunities with the sufficient set of reduced sets of characters.

3. The computer-implemented method of claim 1, the plurality of character-reduced texts comprising a plurality of sufficient sets of reduced sets of characters forming a plurality of minimal character reduction options.

4. The computer-implemented method of claim 1, the method further comprising:
categorizing the selection from the user as a type of character reduction technique;
storing the categorized selection as historical data; and
assigning the type of character reduction technique a priority in the writing tone profile of the user.

5. The computer-implemented method of claim 1, the creating the plurality of character-reduced texts based on the analyzed conformity with the writing tone profile of the user comprising maintaining a writing style tone of the received text in at least one of the plurality of character-reduced texts.

6. The computer-implemented method of claim 1, the character reduction techniques comprising at least one technique selected from the group comprising: abbreviations, acronyms, nicknames, space removal, descriptive modifier removal, descriptive modifier replacement, short date formatting, and vowel removal.

7. The computer-implemented method of claim 1, the method further comprising:
detecting a tone change in a character-reducing text of the plurality of character-reduced texts based on the tone profile of the user, the tone change being a change in an emotional tone, a change in a social tendency tone, or a change in a writing style tone; and
notifying the user of the tone change.

8. The computer-implemented method of claim 1, the method further comprising:
comparing the character count of the text to the character limit of the field while the user is entering the text into the field; and
performing the identifying, analyzing, creating, presenting, receiving, and replacing in response to the character count being greater than the character limit.

9. A computer system for minimally reducing text characters in a field having a character limit, the computer system comprising:
a memory medium comprising program instructions;
a bus coupled to the memory medium; and
a processor, for executing the program instructions, coupled to a minimal character reduction engine via the bus that when executing the program instructions causes the system to:
receive text, comprising a plurality of textual characters and having a character count, in the field having the character limit;
analyze the text for an emotional tone and a social tendencies tone by causing the system to apply a machine learning algorithm that classifies a set of emotion categories to the text to produce an emotional tone score, and to test the text against a social tone databank to produce a social tone score;
identify a set of character reduction opportunities in the text, each character reduction opportunity of the set of character reduction opportunities comprising a plurality of characters that can be rewritten as a reduced set of characters;
analyze each reduced set of characters of each character reduction opportunity for conformity with a writing tone profile of a user, the writing tone profile of the user comprising an ordered priority of character reduction techniques;
create, based on the analyzed conformity with the writing tone profile of the user, a plurality of character-reduced texts from the received text using at least one analyzed reduced set of characters in each of the plurality of character-reduced texts, the creating comprising maintaining an emotional tone or a social tendency tone of the received text in at least one of the plurality of character-reduced texts, the plurality of character-reduced texts each incorporating only a sufficient set of reduced sets of characters that, when traded for a corresponding plurality of characters of the set of character reduction opportunities, brings the character count of the text to within the character limit, and the set of character reduction opportunities in the text being identified and applied to the plurality of character-reduced texts according to the ordered priority;
analyze each of the plurality of character-reduced texts for an emotional tone and a social tendencies tone by causing the system to apply a machine learning algorithm that classifies a set of emotion categories to the character-reduced text to produce a character-reduced text emotional tone score, and to test the character-reduced text against a social tone databank to produce a character-reduced text social tone score;
present the plurality of character-reduced texts to the user to bring the character count of the text to within the character limit, the presenting comprising displaying a comparison of the emotional and social tone scores associated with the received text against the emotional and social tone scores associated with each character-reduced text of the plurality of character-reduced texts;

receive a selection by the user of one character-reduced text of the plurality of character-reduced texts;
replace the text with the selected character-reduced text;
submit the character-reduced text; and
adding the character-reduced text selection by the user to the writing tone profile of the user.

10. The computer system of claim 9, the instructions further causing the system to modify the text by trading the corresponding plurality of characters of the set of character reduction opportunities with the sufficient set of reduced sets of characters.

11. The computer system of claim 9, the plurality of character-reduced texts comprising a plurality of sufficient sets of reduced sets of characters forming a plurality of minimal character reduction options.

12. The computer system of claim 9, the instructions further causing the system to:
categorize the selection from the user as a type of character reduction technique;
store the categorized selection as historical data; and
assign the type of character reduction technique a priority in the writing tone profile of the user.

13. The computer system of claim 9, the instructions further causing the system to maintain a writing style tone of the received text in at least one of the plurality of character-reduced texts.

14. The computer system of claim 9, the character reduction techniques comprising at least one technique selected from the group comprising: abbreviations, acronyms, nicknames, space removal, descriptive modifier removal, descriptive modifier replacement, short date formatting, and vowel removal.

15. The computer system of claim 9, the instructions further causing the system to:
detect a tone change in a character-reducing text of the plurality of character-reduced texts based on the tone profile of the user, the tone change being a change in an emotional tone, a change in a social tendency tone, or a change in a writing style tone; and
notify the user of the tone change.

16. The computer system of claim 9, the instructions further causing the system to:
compare the character count of the text to the character limit of the field while the user is entering the text into the field; and
perform the instructions causing the system to identify, analyze, create, present, receive, and replace in response to the character count being greater than the character limit.

17. A computer program product for minimally reducing text characters in a field having a character limit, the computer program product comprising a computer readable storage device, and program instructions stored on the computer readable storage device, to:
receive text, comprising a plurality of textual characters and having a character count, in the field having the character limit;
analyze the text for an emotional tone and a social tendencies tone, by: applying a machine learning algorithm that classifies a set of emotion categories to the text to produce an emotional tone score, and testing the text against a social tone databank to produce a social tone score;
identify a set of character reduction opportunities in the text, each character reduction opportunity of the set of character reduction opportunities comprising a plurality of characters that can be rewritten as a reduced set of characters;
analyze each reduced set of characters of each character reduction opportunity for conformity with a writing tone profile of a user, the writing tone profile of the user comprising an ordered priority of character reduction techniques;
create, based on the analyzed conformity with the writing tone profile of the user, a plurality of character-reduced texts from the received text using at least one analyzed reduced set of characters in each of the plurality of character-reduced texts, the creating comprising matching an emotional tone or a social tendency tone of the received text in at least one of the plurality of character-reduced texts, the plurality of character-reduced texts each incorporating only a sufficient set of reduced sets of characters that, when traded for a corresponding plurality of characters of the set of character reduction opportunities, brings the character count of the text to within the character limit, and the set of character reduction opportunities in the text being identified and applied to the plurality of character-reduced texts according to the ordered priority;
analyze each of the plurality of character-reduced texts for an emotional tone and a social tendencies tone by: applying a machine learning algorithm that classifies a set of emotion categories to the character-reduced text to produce a character-reduced text emotional tone score, and testing the character-reduced text against a social tone databank to produce a character-reduced text social tone score;
present the plurality of character-reduced texts to the user to bring the character count of the text to within the character limit, the presenting comprising displaying a comparison of the emotional and social tone scores associated with the received text against the emotional and social tone scores associated with each character-reduced text of the plurality of character-reduced texts;
receive a selection by the user of one character-reduced text of the plurality of character-reduced texts;
replace the text with the selected character-reduced text;
submit the character-reduced text; and
adding the character-reduced text selection by the user to the writing tone profile of the user.

18. The computer program product of claim 17, the computer readable storage device further comprising instructions to modify the text by trading the corresponding plurality of characters of the set of character reduction opportunities with the sufficient set of reduced sets of characters.

19. The computer program product of claim 17, the computer readable storage device further comprising instructions to:
categorize the selection from the user as a type of character reduction technique;
store the categorized selection as historical data; and
assign the type of character reduction technique a priority in the writing tone profile of the user.

20. The computer program product of claim 17, the computer readable storage device further comprising instructions to:

detect a tone change in a character-reducing text of the plurality of character-reduced texts based on the tone profile of the user, the tone change being a change in an emotional tone, a change in a social tendency tone, or a change in a writing style tone; and notify the user of the tone change.

* * * * *